United States Patent [19]
Nelson et al.

[11] Patent Number: 5,347,397
[45] Date of Patent: Sep. 13, 1994

[54] DIOPTER CELL ASSEMBLY FOR A BINOCULAR VIEWING SYSTEM

[75] Inventors: John C. Nelson; Gary M. Vance, both of Roanoke; Vincent J. Thomas; Thomas H. Pifer, Jr., both of Christianburg, all of Va.

[73] Assignee: ITT Corporation, New York, N.Y.

[21] Appl. No.: 39,755

[22] Filed: Mar. 30, 1993

[51] Int. Cl.$^5$ ............................................. G02B 23/02
[52] U.S. Cl. ..................................... 359/629; 359/407; 359/402; 359/482
[58] Field of Search ............... 359/407, 402, 406, 408, 359/503, 504, 506, 480, 481, 482, 629

[56] References Cited

U.S. PATENT DOCUMENTS

| 3,482,897 | 12/1969 | Hopp | 359/402 |
| 4,758,077 | 7/1988 | Beecher | 359/407 |
| 4,961,626 | 10/1990 | Founier, Jr. et al. | 359/407 |
| 5,157,553 | 10/1992 | Phillips et al. | 359/744 |

FOREIGN PATENT DOCUMENTS 41507  7/1915  Canada ................................. 359/402

Primary Examiner—Eugene R. LaRoche
Assistant Examiner—Vu Le
Attorney, Agent, or Firm—Arthur L. Plevy; Patrick M. Hogan

[57] ABSTRACT

An optical device for reorienting an optical image from a first optical pathway to a second optical pathway and the method of manufacturing such an optical device. In a preferred embodiment, a housing is provided that defines at least two optical pathways. Both optical pathways align with a common aperture in the housing. Since both optical pathways are generally cylindrically shaped and the common aperture aligns with both optical pathways, the common aperture is elliptical in shape so as to correspond to the plane of intersection between the two cylindrical pathways. A generally rectangular mirror, that is larger than the elliptical aperture in the housing, is placed over the aperture on the exterior of the housing. As a result, the mirror covers the area of the elliptical aperture and redirects any light passing through the elliptical aperture from one of the optical pathways into the other optical pathway. Since a rectangular mirror is used, and the mirror is assembled externally from the housing, cost and labor savings are produced over that available in the prior art.

19 Claims, 5 Drawing Sheets

DIOPTER CELL ASSEMBLY FOR A BINOCULAR VIEWING SYSTEM

FIELD OF THE INVENTION

The present invention relates to an improved diopter cell assembly for use in a binocular viewing system that contains only a single objective lens arrangement, and more particularly to such diopter cell assemblies that reorient an object image, divided by a beam splitter, into two separate eyepiece assemblies for binocular viewing.

BACKGROUND OF THE INVENTION

Many optical devices, such as some microscopes, telescopes and night vision devices, are viewed with binocular vision but only use a single objective lens arrangement. In such systems, when a single source image is viewed the light from the image must be divided into two separate corresponding optical outputs in order to allow for binocular viewing. Traditionally, the division of a single source image into two corresponding binocular images has been accomplished by utilizing a collimator lens assembly, a beam splitter and two diopter cell assemblies. The collimator lens assembly re-images a source image at a substantially infinite conjugate. As such, the rays of light leaving the collimator lens assembly are substantially parallel. The parallel light is then evenly divided by the beam splitter and directed toward the diopter cell assemblies. The diopter cell assemblies provide optical power to the split beam, thereby either diverging or converging the parallel beam path, and directs the split image into the two eyepiece lens assemblies utilizing a mirror, prism or the like. See U.S. Pat. No. 5,157,553 issued on Oct. 20, 1992 entitled COLLIMATOR FOR BINOCULAR VIEWING SYSTEM by E. N. Phillips, et al. and assigned to ITT Corporation the assignee herein. That patent describes a prior art collimator assembly and related optical elements in a binocular viewing system.

Binocular viewing system that utilize only a single objective lens assembly are common in the design of night vision devices. The use of a single objective lens in a night vision device permits the use of only a single image intensifier tube within the assembly, thereby minimizing the cost and complexity of the system. For instance, in FIG. 1, there is shown a block diagram schematic of a prior art AN/PVBS-7B night vision device 10 commercially manufactured by ITT Corporation, the assignee herein. Referring to FIG. 1, it can be seen that a single objective lens assembly 12 is positioned at one end of the device 10. The objective lens assembly 12 focuses impinging infrared energy onto the image intensifier tube 14, which converts impinging infrared energy into a visible image. The visible image passes through a collimator lens assembly 16 that reimages the visible image at a substantially infinite conjugate. The infinite conjugate image is divided evenly by a beam splitter 20 and is directed toward the left and right diopter cell assemblies 22, 24 respectively. In each of the two diopter cell assemblies 22, 24, the split, infinite conjugate image passes through a lens 26 and is reflected off a mirror 28 toward either the left or right eyepiece lens assembly 30, 32, where the image is viewed with binocular vision. Typically, the left and/or right eyepiece lens assembly 30, 32 are adjustable back and forth in the directions of arrow 33, so as to allow the eyepiece lens assemblies 30, 32 to be adjusted to the specific eye spacing of an individual. For this reason, the diopter cell assemblies 22, 24 are commonly held within slots 36, 38 on a support member 40. As such, the diopter cell assemblies 22, 24 can move back and forth as a unit with the eyepiece lens assemblies 30, 32.

Referring to FIGS. 2 and 3, the construction of a typical prior art diopter cell assembly 24 can be described. As can be seen, light enters the diopter cell assembly 24 from the beam splitter through a lens element 26 that adds an optical power to the infinite conjugate beam. Once the light enters diopter cell assembly 24, the light reflects off a mirror 28 that alters the path of the light by 45 degrees. In the shown prior art diopter cell 24, the mirror 28 is flat and has an elliptical shaped profile. The elliptical shape of the mirror 28 is required in order for the mirror 28 to properly fit within the housing of the diopter cell at a 45 degree angle. The mirror 28 is custom manufactured from a segment of glass cut from a cylinder of glass at an angle. The face surface 42 of the glass is then polished and a reflective surface 44 is deposited on the face surface 42. In the manufacturing of mirrors, it is not economically practical to cut small elliptical shaped mirrors from a large flat mirror. As such, each of the mirrors 28 for the diopter cell assemblies are individually made by cutting a glass blank from a cylinder, polishing the face surface of the glass blank, and depositing the reflective surface onto the glass blank. Consequently, the costs associated with manufacturing the mirror 28 add significantly to the overall cost of the diopter cell assembly 24. Once the mirror 28 is manufactured, the mirror 28 is then manually placed within the housing of the diopter cell assembly 24. The mirror 28 is then manually aligned and affixed to the diopter cell assembly housing with adhesive.

The shown diopter cell assembly 24 is from a prior art AN/PVBS-7B night vision goggle device. In such a device each of the diopter cell assemblies include an L.E.D. The purpose of the L.E.D. is to superimpose a signal light over the image being viewed. For instance, a small light might may be superimposed over the viewed image to indicate to a viewer that the battery is low in the assembly or to indicate that an ancillary infrared light source has been turned on. In such a system, the L.E.D. is typically positioned within the diopter cell assembly 24 behind the mirror 28. As such, the L.E.D. creates a lighted figure on the mirror 28 that is superimposed over the image being viewed. Referring to FIGS. 2 and 3, it can be seen that a receptacle 46 for retaining an L.E.D. (not shown) is positioned on the back surface 48 of the mirror 28. The back surface 48 of the mirror 28 is not polished, as such a hole 50 is drilled into the mirror 28 from its back surface 48 toward its face surface 42, to allow light from the L.E.D. to pass through the material of the mirror. Furthermore, a segment 52 of the reflective surface 44 is removed from the face surface 42 of the mirror 28 in the region of the hole 50. As a result, light from the L.E.D. can pass through the hole 50 and pass through the removed segment 52 on the reflective surface 44 in order to create a viewable image on the surface of the mirror 28. In the prior art, the segment 52 of the reflective surface 44 removed is typically created by masking a small segment of the face surface 42 of the mirror as the reflective surface 44 is being deposited.

The receptacle 46 for holding the L.E.D. is held onto the back surface 48 of the mirror 28 by a double sided adhesive donut 54. The receptacle 46 is manually installed and is manually aligned over the drilled hole 50. The creation of an elliptical shaped mirror 28, the drilling of the hole 50 in the mirror 28, the removal of a segment 52 of the reflective surface 44, the placement of the mirror 28 in the diopter cell 28 and the attachment of the receptacle 46 to the mirror 28 combine to add significantly to cost by which such a prior art diopter cell can be manufactured.

It is therefore an object of the present invention to provide a diopter cell assembly for a binocular viewing system that is less complicated to manufacture, requires less labor to manufacture and is less expensive than prior art diopter cells for a given application.

It is a further object of the present invention to provide such a diopter cell assembly that can be interchanged with a prior art diopter cell assembly without necessitating and further changes in the overall binocular viewing system design.

SUMMARY OF THE INVENTION

The present invention is a diopter cell assembly or like optical device for reorienting an optical image from a first optical pathway to a second optical pathway and the method of manufacturing such a diopter cell assembly. In a preferred embodiment of the present invention, a housing is provided that defines at least two optical pathways. Both optical pathways align with a common aperture within the housing. Since both optical pathways are generally cylindrically shaped and the common aperture aligns with both optical pathways, the common aperture is elliptical in shape so as to correspond to the plane of intersection between the two cylindrical pathways. A generally rectangular mirror, that is larger than the elliptical aperture in the housing, is placed over the aperture on the exterior of the housing so as to overlap the elliptical aperture. As a result, the mirror covers the area of the elliptical aperture and redirects any light passing through one of the optical pathways into the other optical pathway. Since a simple rectangular mirror is used, and the mirror is assembled externally from the housing, cost and labor savings are produced over that available in the prior art.

In a preferred embodiment, the mirror is attached to the diopter cell housing by placing the mirror in a retaining member and mechanically joining the retaining member to the housing. The mirror is held at a fixed orientation within the retaining member. Additional, the retaining member only interconnects with the housing in a single orientation. As such, by attaching the retaining member to the housing, the mirror is automatically properly aligned over the elliptical aperture in the housing. Furthermore, a L.E.D. receptacle may be unistructurally formed as part of the retaining member. As such, the L.E.D. receptacle may be automatically aligned over a transparent segment of the mirror so as to produce a superimposed image over the image being redirected by the diopter cell assembly. The unistructural construction of the L.E.D. receptacle with the retaining member, and the automatic alignment of the L.E.D. receptacle results in both cost and labor saving over the prior art.

BRIEF DESCRIPTION OF THE DRAWINGS

For a better understanding of the present invention, reference is made to he following description of exemplary embodiments thereof, considered in conjunction with the accompanying drawings, in which.

DETAILED DESCRIPTION OF THE INVENTION

Figure 1:
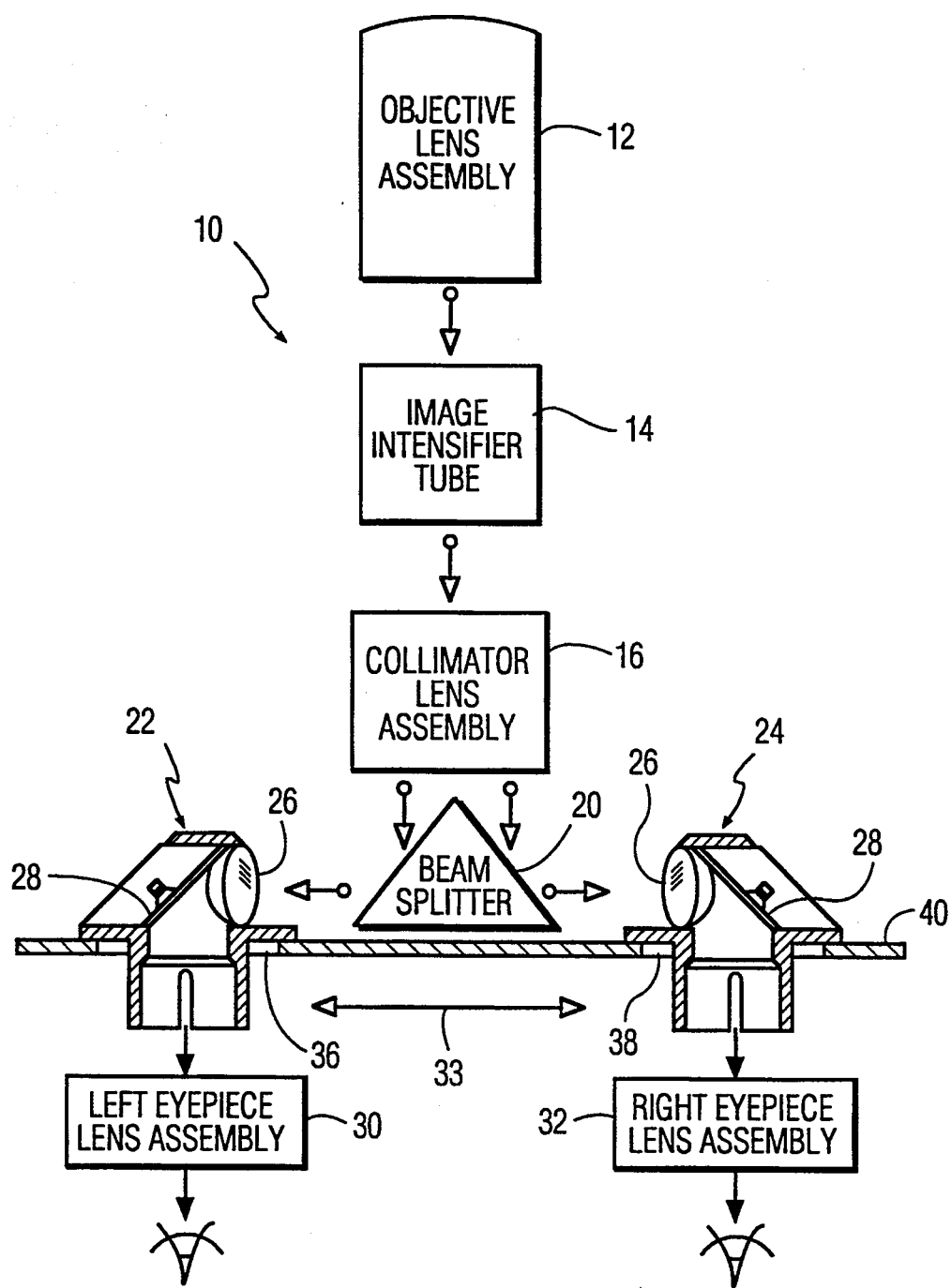
FIG. 1 is a schematic view of a prior art night vision goggle assembly showing the position and function of diopter cell assemblies.
Figure 2:
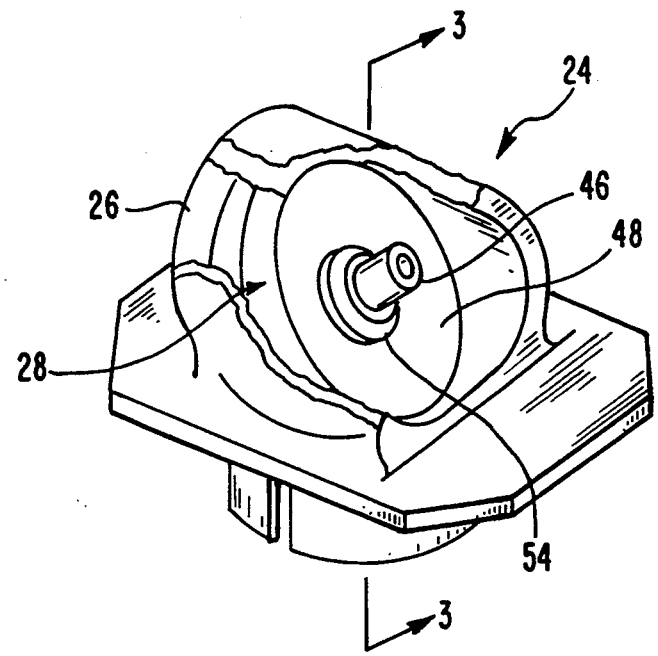
FIG. 2 is a partially fragmented perspective view of one embodiment of a prior art diopter cell assembly.
Figure 3:
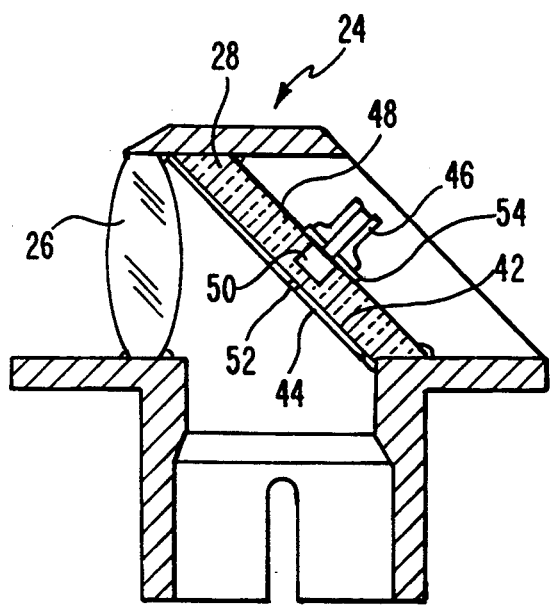
FIG. 3 is a cross-sectional view of the prior art embodiment of FIG. 2, viewed along section line 3—3.
Figure 4:
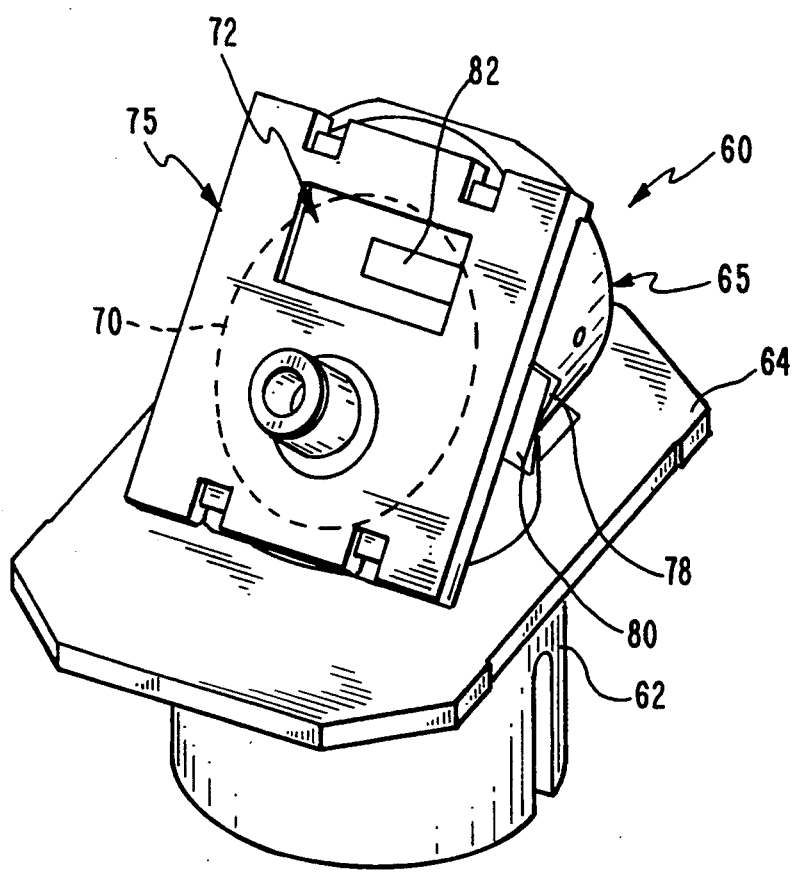
FIG. 4 is a perspective view of one preferred embodiment of the present invention diopter cell assembly.
Figure 5:
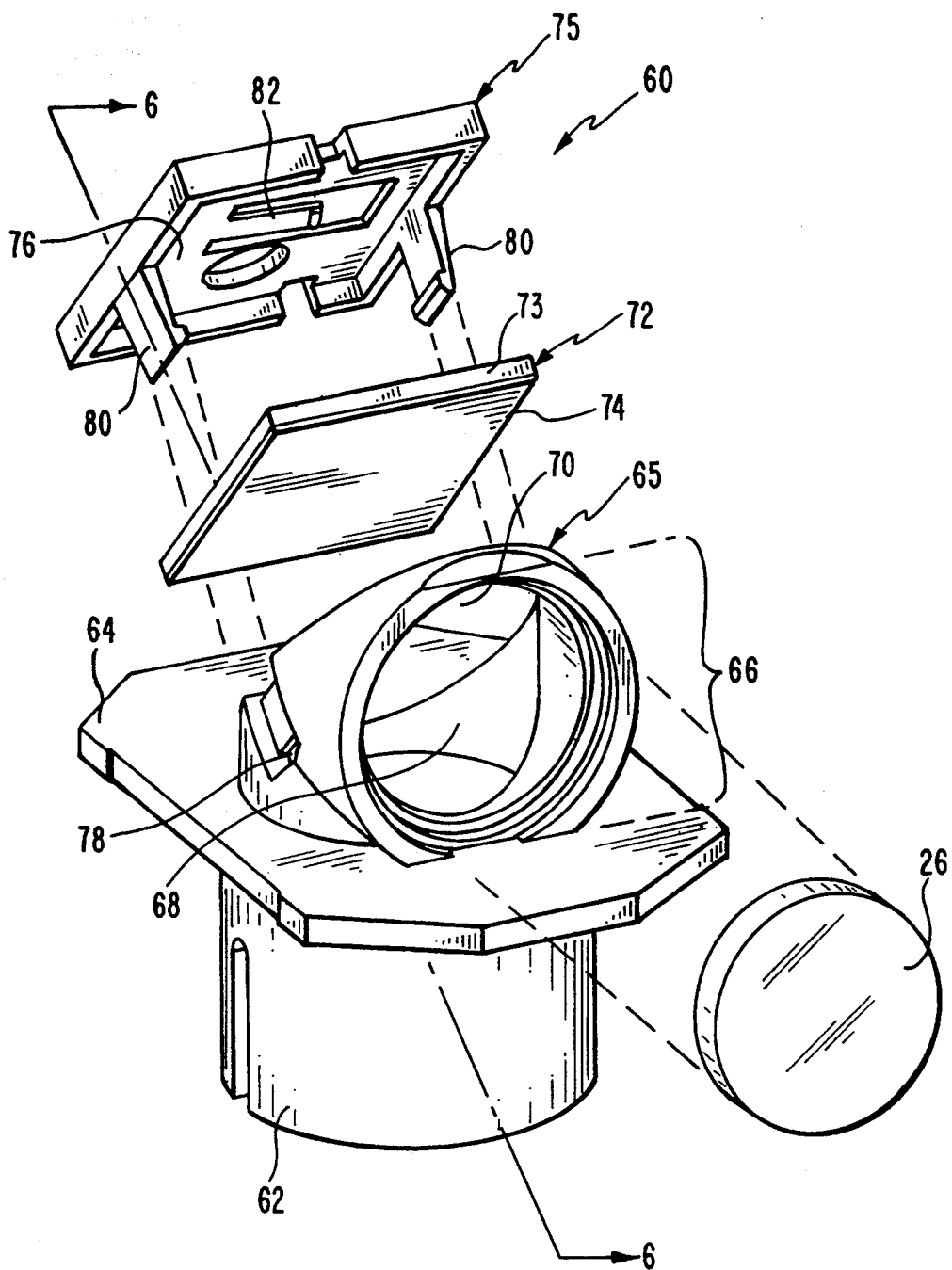
FIG. 5 is an exploded perspective view of the embodiment shown in FIG. 4.

Referring to FIGS. 4 and 5 there is shown one preferred embodiment of the present invention diopter cell assembly 60. The diopter cell assembly 60 includes an eyepiece assembly connector 62 and base flange 64 that are sized and shaped to be the same as prior art diopter cell assemblies. The eyepiece assembly connector 62 and base flange 64 are the parts of the diopter cell assembly 60 that physically engage the binocular viewing system of which the diopter cell assembly is a part. As such, the present invention diopter cell 60 can be substituted into any prior art binocular viewing system without necessitating modifications to that system.

In the shown embodiment, the diopter cell base 65, that contains the eyepiece lens assembly connector 62 and the base flange 64, is unistructurally formed of a single material, such as molded plastic. The head region 66 of the diopter cell base 65 defines a first optical pathway having a forward facing opening 68 and an opposite rearward facing opening 70. The forward opening 68 is substantially round and is adapted to retain a lens element 26 much in the same manner as prior art diopter cell assemblies. The rearward opening 70 is elliptical in shape, caused by the angle of the surface through which the rearward opening 70 extends. A flat mirror 72 having a glass substrate 73 and a reflective surface 74 disposed on the substrate 73 is placed across the elliptical opening 70. In the shown embodiment, the mirror 72 is rectangular in shape and overlaps the edges of the elliptical rearward opening 70 so as to provide full coverage of the elliptical opening 70.

The mirror 72 is held over the elliptical rearward opening 70 of the diopter cell base 65 by a snap-on retaining member 75. A relief 76 is disposed in the center of the retaining member 75. The relief 76 is rectangular in shape, corresponding in size and shape to the mirror 72. As a result, the mirror 72 fits within the relief 76 of the retaining member 75, whereby the retaining member 75 envelops all the surfaces of the mirror 72 except for the reflective surface 74. Female pawl receptacles 78 are formed in the exterior of the head region 66 of the diopter cell base 65. Locking pawls 80 extend from the retaining member 75 and snap fit into the pawl receptacles 78. As such, the retaining member 75 is mechanically joined to the diopter cell base 65 and retains the mirror 72 over the elliptical rearward opening 70.

A base pawl 82 is formed on the base of the retaining member 75, against which the mirror 72 rests. The base pawl 82 is slightly biased toward the mirror 72. As a result, when the mirror 72 is placed within the retaining member 75 and the retaining member 75 is attached to the diopter cell base 65, the base pawl 82 biases the mirror 72 against the diopter cell base 65 and compensates for any tolerance variances that may exist between the retaining member 75 and the diopter cell base 65.

Figure 6:
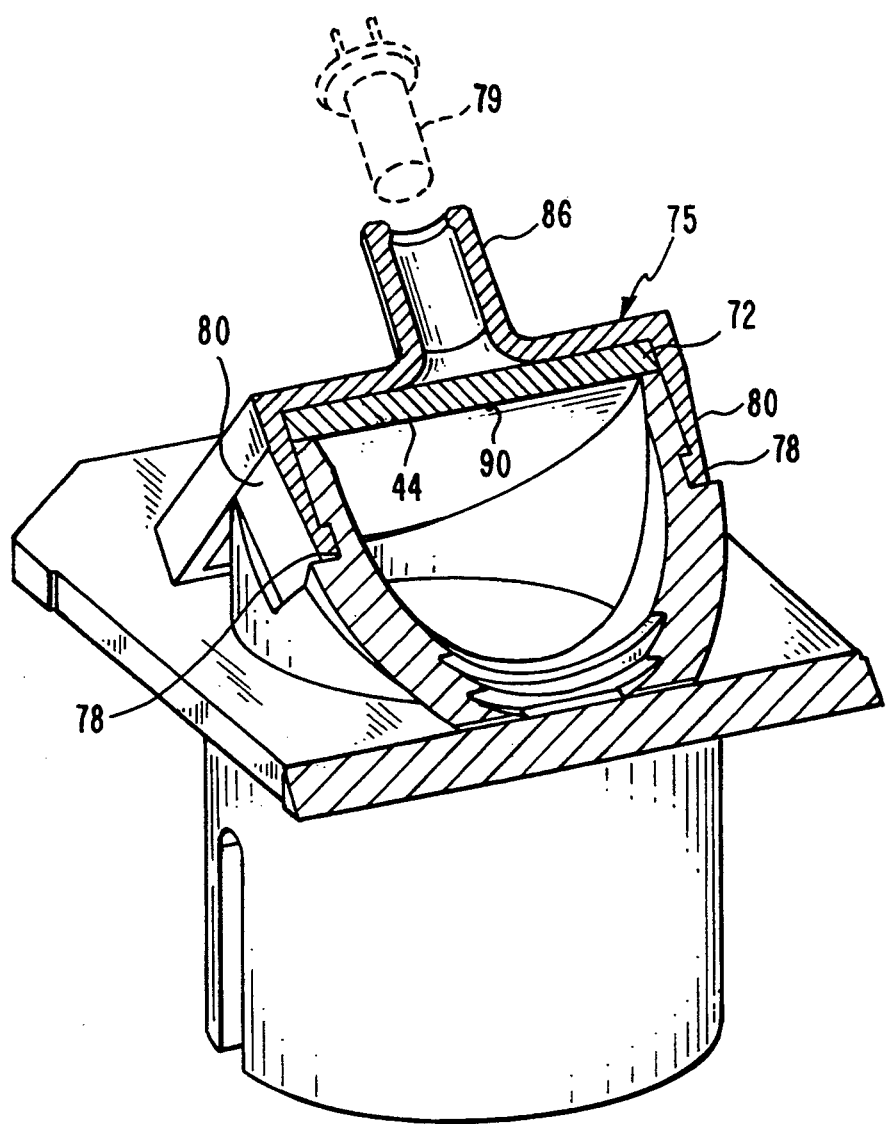
FIG. 6 is a cross-sectional view of the embodiment shown in FIG. 5, viewed along section line 6—6.

Referring to FIG. 6, it can be seen that an L.E.D. receptacle 86 is unistructurally formed as part of the retaining member 75. The receptacle 86 is shaped in the same manner as prior art receptacles but is now molded into the same structure as the retaining member 75. Also, from FIG. 6, it can be seen that as the locking pawls 80 on the retaining member 75 engage the pawl receptacles 78 in the diopter cell base 65, the retaining member 75 becomes securely attached to the diopter cell base 65 and the mirror 72 becomes entrapped between the retaining member 75 and the diopter cell base 65. Since the mirror 72 fits within the retaining member 75 at a set orientation and the retaining member 75 interconnects with the diopter cell base 65 at a set orientation, the mirror 72 is automatically properly aligned over the elliptical opening of the diopter cell base 65, as the retaining member 75 is joined to the diopter cell base 65. As such, the prior art problems of creating an elliptical mirror, aligning the mirror and adhesively attaching the mirror in place are eliminated. Furthermore, since the L.E.D. receptacle 86 is unistructurally formed as part of the retaining member 75, the L.E.D. receptacle 86 is automatically properly aligned as the retaining member 75 is attached to the diopter cell base 65. As a result, the prior art problems of aligning the L.E.D. receptacle and attaching the L.E.D. receptacle to the mirror are also eliminated.

In the shown embodiment a small aperture 90 is formed in the reflective surface 44 of the mirror 72 directly below the region of the L.E.D. receptacle 86. The aperture 90 allows light from an L.E.D. 79 to pass through the mirror 72 and be viewed by the person utilizing the binocular device. In the present invention, the aperture 90 is formed by removing the reflective surface 44 with a laser. The aperture 90 can be first made in the mirror 72 and then the mirror 72 assembled between the retaining member 75 and the diopter cell base 65, or the mirror 72 can be first assembled and the aperture 90 then created by a laser. As such, the laser can be directed either through the L.E.D. receptacle 86 or through the forward opening 68 (see FIG. 5) to create the aperture 90.

Since the mirror 72 is not elliptically shaped, it need not be cut from a cylinder of glass. As such, the mirror 72 can be cut from a large flat mirror and the back surface of the mirror 72 can be economically manufactured in a polished state. This eliminates the need to drill a hole in the material of the mirror as is commonly practiced in the prior art. Furthermore, by creating the aperture 90 on a common mirror using a laser, the prior art manufacturing steps of cutting an elliptical mirror from a cylinder of glass, polishing one surface of the cut glass, coating the surface with a reflective material and masking a small segment to create the needed aperture can be eliminated.

In the present invention, by utilizing a simple rectangular mirror, and a unistructural retaining member/L.E.D. holder assembly, large reductions can be produced in the labor and cost of manufacturing the diopter cell assembly. The embodiment of the present invention diopter cell assembly is merely exemplary. As such, it will be understood that the embodiment described herein can be varied by a person skilled in the art without departing from the spirit and scope of the invention. All such variations and modifications regarding differing physical geometries, proportions, or materials are intended to be included within the scope of the invention as defined in the appended claims.

What is claimed is:

1. An optical device for reorienting an optical image, comprising:
    a housing having a first and second optical pathway disposed therein, wherein said first and second optical pathway both align with a common aperture in said housing;
    a mirror disposed external of said housing, wherein said mirror overlaps and covers said aperture, said mirror reflecting light traveling through said aperture from said first optical pathway into said second optical pathway; and
    attachment means for attaching said mirror to said housing, over said aperture, wherein said attachment means includes a retaining member that partially envelops said mirror and mechanically interconnects with said housing by means of a snap fit created by the shapes of said retaining member and said housing, thereby retaining said mirror over said aperture between said retaining member and said housing.

2. The device according to claim 1, further including a bias means for biasing said mirror against said housing, over said aperture.

3. The device according to claim 1, wherein said mirror redirects a viewable image from said first optical pathway into said second optical pathway and said device includes a means to superimpose a desired secondary image over said viewable image as said viewable image is redirected.

4. The device according to claim 3, wherein said mirror includes a transparent substrate having a reflective surface disposed thereon, wherein a segment of said reflective surface is removed in the shape of said secondary image.

5. The device according to claim 4, further including a receptacle means for retaining a light source, wherein said mirror is disposed between said light source and said aperture, and light from said light source shines through the removed segment of said reflective surface and is superimposed over said viewable image in said second pathway.

6. The device according to claim 5, wherein said attachment means for attaching said mirror to said housing and said receptacle means for retaining said light source are unistructurally formed as a single structural unit.

7. The device according to claim 1, wherein said aperture is generally elliptical in shape and said mirror is generally rectangular in shape having a surface area large enough to overlap and cover said aperture.

8. The device according to claim 6, wherein said receptacle means aligns over the removed segment of said reflective surface as said mirror is attached to said housing by said attachment means.

9. The device according to claim 1, wherein said retainer member includes at least one locking pawl that mechanically engages said housing with a snap-fit.

10. A method of manufacturing an optical device for reorienting a viewed image, comprising the steps of:
    providing a housing that defines a first and second optical pathway, wherein said first and second optical pathway align with a common aperture in said housing;

placing a mirror larger than said aperture, over said aperture, thereby directing light impinging on said mirror through said aperture from said first optical pathway into said second optical pathway, wherein said step of placing a mirror over said aperture includes the step of placing said mirror in a retaining member and mechanically joining said retaining member to said housing whereby said mirror is positioned over said aperture between said retaining member and said housing; and further including the step of providing a receptacle for a light source on said retaining member, whereby said receptacle is properly aligned over a given segment of said mirror as said retaining member is mechanically joined to said housing.

11. The method according to claim 10, wherein said mirror includes a reflective surface disposed on a transparent substrate and said method includes removing a segment of said reflective surface in a given shape from said transparent substrate.

12. The method according to claim 11, further including the step of aligning a receptacle for a light source with said segment of said reflective surface removed, wherein said segment is disposed between said receptable and said aperture in said housing.

13. The method according to claim 10, further including the step of biasing said mirror against said housing, over said aperture.

14. The method according to claim 10, wherein said retaining member and said receptacle are unistructurally formed as a single unit.

15. The method according to claim 10, wherein said retaining member mechanically joins with said housing with a snap-fit created by the shapes of said retaining member and said housing.

16. The method according to claim 11, wherein said step of removing a segment of said reflective surface includes removing said segment with a laser.

17. An optical device for reorienting an optical image, comprising:

a housing having a first and second optical pathway disposed therein, wherein said first and second optical pathway both align with a common aperture in said housing; and a mirror disposed external of said housing, wherein said mirror overlaps and covers said aperture, said mirror reflecting light traveling through said aperture from said first optical pathway into said second optical pathway, wherein said aperture is generally elliptical in shape and said mirror is in a generally rectangular shape having a surface area large enough to overlap and cover said aperture.

18. The device according to claim 17, wherein said mirror redirects a viewable image from said first optical pathway into said second optical pathway and said device includes a means to superimpose a desired secondary image over said viewable image as said viewable image is redirected.

19. The device according to claim 18, including an attachment means for attaching said mirror against said housing, over said aperture and further including a receptacle means for retaining a light source, wherein said mirror is disposed between said light source and said aperture, and light from said light source shines through a removed segment of a reflective surface of said mirror and is superimposed over said viewable image in said second pathway, wherein said receptacle means aligns over the removed segment of said reflective surface as said mirror is attached to said housing by said attachment means.

* * * * *